(12) United States Patent
Karakawa

(10) Patent No.: US 7,103,074 B2
(45) Date of Patent: Sep. 5, 2006

(54) LASER VIDEO PROJECTION SYSTEM AND METHOD WITH ANTI-PIRACY FEATURE

(75) Inventor: Masayuki Karakawa, Newmarket, NH (US)

(73) Assignee: Corporation for Laser Optics Research, Portsmouth, NH (US)

( * ) Notice: Subject to any disclaimer, the term of this patent is extended or adjusted under 35 U.S.C. 154(b) by 260 days.

(21) Appl. No.: 10/862,193

(22) Filed: Jun. 3, 2004

(65) Prior Publication Data

US 2005/0018717 A1   Jan. 27, 2005

Related U.S. Application Data

(60) Provisional application No. 60/475,422, filed on Jun. 3, 2003.

(51) Int. Cl.
*H01S 3/11* (2006.01)

(52) U.S. Cl. .............. 372/10; 369/84; 380/201

(58) Field of Classification Search ............... 369/84; 372/99, 10, 20
See application file for complete search history.

(56) References Cited

U.S. PATENT DOCUMENTS

| | | | | |
|---|---|---|---|---|
| 5,321,709 A | * | 6/1994 | Beausoleil | 372/22 |
| 5,832,013 A | * | 11/1998 | Yessik et al. | 372/26 |
| 6,304,237 B1 | * | 10/2001 | Karakawa | 345/84 |

2002/0018036 A1   2/2002   Karakawa

FOREIGN PATENT DOCUMENTS

EP   88300373.3   1/1988
WO   WO/2004/109872   12/2004

OTHER PUBLICATIONS

Lee, D., et al., "High-efficiency, high-power, OPO-based RGB source", CLEO, pp. 424, (2001).
Takeuchi, Eric, et al., "Laser Digital Cinema", Proc. SPIE, vol. 4294, pp. 28-35 (2001).

* cited by examiner

Primary Examiner—Minsun Oh Harvey
Assistant Examiner—Tuan Nguyen
(74) Attorney, Agent, or Firm—Fish & Neave IP Group Ropes & Gray LLP

(57) ABSTRACT

A pulsed laser device and a laser display system using the pulsed laser device are disclosed that thwart recording of displayed video images with electronic imaging devices. The pulsed laser device is Q-switched, whereby the Q-switch trigger pulses have a temporal pattern that includes a blanking period of a duration that is longer than a repetition time between consecutive trigger pulses and shorter than a time period perceived by the human eye. The output beam of the Q-switched pulse laser is frequency-converted by non-linear optical frequency conversion into an imaging beam, for example, a three-color RBG beam, that can be modulated for displaying color images. The blanking period renders the displayed images practically unsuitable for off-screen recording with electronic image recording devices, such as CCD movie cameras.

20 Claims, 3 Drawing Sheets

LASER VIDEO PROJECTION SYSTEM AND METHOD WITH ANTI-PIRACY FEATURE

CROSS-REFERENCE TO OTHER PATENT APPLICATIONS

This application claims the benefit of U.S. provisional Patent Application No. 60/475,422, filed Jun. 3, 2003, the content of which is incorporated herein by reference.

BACKGROUND OF THE INVENTION

The invention is directed to a laser video projection system, and more particularly to a laser video projection system for digital motion pictures that thwarts recording of the projected image with a camcorder or an electronic camera.

Piracy and illegal copying of digital audio and video material has become widespread with the availability of inexpensive CD and DVD burners. This threatens the existence of record labels and of movie studios and motion picture distributors. One way of producing illegal copies is to intercept file content from a legal copy of copyrighted work, either by making an illegal copy of a CD/DVD or by intercepting data transferred, for example, from a movie studio to a movie theater intended for digital projection. This process requires some skill on the part of the copyright infringer. Moreover, making illegal copies from CD/DVD may become unworkable due to security features added to the original recording.

Another albeit less sophisticated way of copying movies is to record a projected movie directly from the projection screen in a movie theater with an electronic camera, for example, a CCD camera that can be analog or digital. In current film-based projectors, a movie is projected frame-by-frame, and a blanking period (dark screen) of less than few ms duration exists in regular interval, which is not perceived by the human eye. However, camcorders with a response time in the order of microseconds record during the brief moment the projector light is blocked an objectionable black stripe that moves across the picture. Consequently, such recordings have little commercial value and are mainly found in countries where recordings are sold based on price alone, without regard for the quality of the recording.

There is an increased emphasis to record, transmit and project images digitally. Digital projection systems emit a continuous stream of light, so that images projected with digital projection systems do not include such blanking periods and can therefore readily be recorded by a pirate using a camcorder. Since there may be no perceivable image degradation, the pirate may produce an illegal copy with a CD burner and sell these copies to a wide market at a substantial profit. This is a big concern for the movie studios, in particular in view of the conversion to digital cinema, which includes digital projection.

Digital projection systems presently use lamp-based systems with LCD light valves or deformable mirrors (DMD), or alternatively laser-based systems. LCD-based systems, especially the one using LCoS (Liquid Crystal on Silicon) panels, are relatively slow, with response times of 5–12 ms, so that any intentionally introduced blanking period will be comparable to the response time of the human eye and hence also be perceived by an observer. The response (rise+fall) time of DMD-based systems is approximately 20–50 μs, and at least one proposed anti-piracy system superimposes on the deformable mirrors a random pattern of approximately 1 ms duration. The resulting distortion of the projected image is not perceived by the human eye, but produces an objectionable image pattern in a movie recorded off a projection screen.

For the reasons stated above, it would therefore be desirable to incorporate anti-piracy features in a laser-based movie projection system that can thwart recording of a digitally projected movie from the projection screen by a camcorder or other type of electronic camera.

SUMMARY OF THE INVENTION

The invention is directed to a system and method for spoiling the recording of digitally projected movies, and more particularly movies projected with a laser-based projection system, with an electronic recording device, such as a camcorder.

According to one aspect of the invention, a pulsed laser device includes an optical cavity, an optically pumped laser medium and a Q-switch disposed in the optical cavity. The pulsed laser device further includes a trigger generator producing trigger pulses to trigger the Q-switch, whereby the trigger pulses have a temporal pattern that includes a blanking period. The duration of the blanking period is selected to be longer than a repetition time between consecutive trigger pulses and shorter than a time period perceived by the human eye.

According to another aspect of the invention, a laser display system includes a pulsed laser device with an optical cavity, an optically pumped laser medium and a Q-switch disposed in the optical cavity. A trigger generator produces trigger pulses to trigger the Q-switch, wherein the trigger pulses have a temporal pattern that includes a blanking period. The pulsed laser device emits a pulsed pump beam that is received by non-linear optical conversion means that frequency-convert the pulsed pump beam into an imaging beam. A spatial light modulator receives image information and modulates the imaging beam according to the received image information to produce a displayed image. The duration of the blanking period is selected to be longer than a repetition time between consecutive trigger pulses and shorter than a time period perceived by the human eye.

According to yet another aspect of the invention, a method of displaying an image with anti-piracy protection includes the acts of producing a Q-switched pulsed laser output beam, whereby the Q-switched beam is Q-switched by trigger pulses having a temporal pattern that includes a blanking period. The method further includes the acts of converting the pulsed laser output beam by non-linear optical frequency conversion to an imaging beam, modulating the imaging beam with image information, and displaying an image formed from the imaging beam containing the image information. The duration of the blanking period is selected to be longer than a repetition time between consecutive trigger pulses and shorter than a time period perceived by the human eye.

Additional embodiments may include one or more of the following features. The repetition time between the consecutive trigger pulses can correspond to a pulse repetition rate of between approximately 10 and 100 kHz, preferably approximately 50 kHz. The duration of the blanking period can be between approximately 1 and 10 milliseconds, preferably between approximately 1 and 2 milliseconds. The trigger pulses can have a pulse width of between approximately 1 and 20 nanoseconds, preferably approximately 10 nanoseconds. An exemplary laser medium can include $Nd:YVO_4$.

To produce a full color image, the non-linear optical conversion means can include several, for example three, non-linear optical frequency converters to produce separate RGB imaging beams, which can be modulated, for example, by using transmissive or reflective LCD spatial light modulators, to form a color image.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a laser display system and method. In particular, the system and method described herein can spoil off-screen recording of digitally displayed and/or projected movies.

Figure 1:
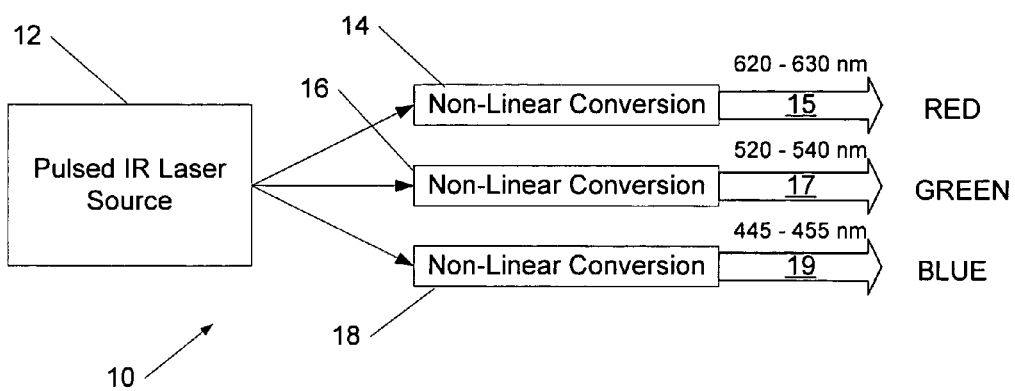
FIG. 1 is a schematic block diagram of a R,G,B laser light source with a pulsed IR laser source.

Referring first to FIG. 1, an exemplary laser light source 10 for projection of digital images and motion pictures includes a pulsed infrared (IR) laser source 12 with an emission wavelength of, for example, 1047 nm or 1064 nm with a high peak power (i.e. with a large pulse energy/pulse width ratio), which is desirable for efficient conversion of the emitted IR radiation to visible wavelengths through various known non linear frequency conversion processes, such as second harmonic generation (SHG), optical parametric oscillation (OPO), sum-frequency-mixing (SFM), etc. For this purpose, the laser light source 10 includes single or multiple, preferably all solid state, non-linear frequency converters 14, 16, 18 that receive and convert the IR laser beam wavelength so as to simultaneously produce a red (R) wavelength beam 15 with a wavelength of about 620 nm to 630 nm; a green (G) wavelength beam 17 with a wavelength of about 520 nm to 540 nm; and blue (B) wavelength beam 19 with a wavelength of about 445 nm to 455 nm. Details of such converters are described, for example, in commonly assigned U.S. Pat. No. 6,304,237, the content of which is incorporated herein by reference in its entirety. The R,G,B wavelengths are particularly useful for color display purposes, since they match the sensitivity of the human eye.

Figure 2:
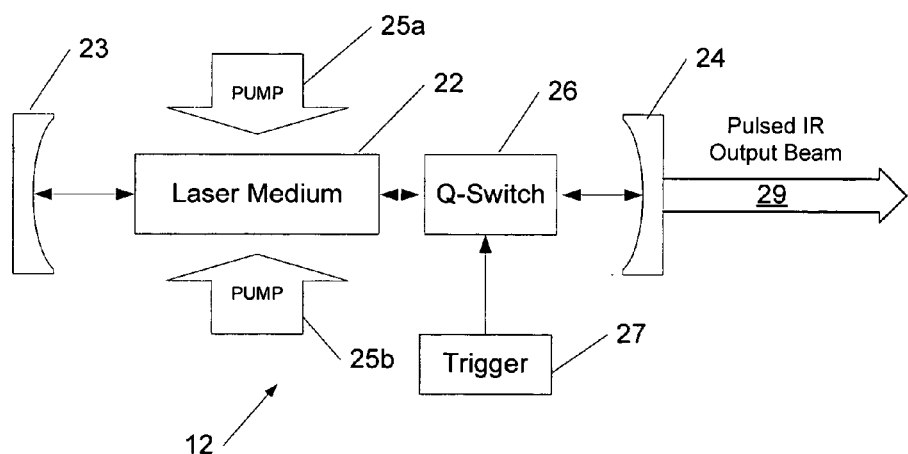
FIG. 2 is a schematic block diagram of the pulsed IR laser source of FIG. 1 with an intra-cavity Q-switch.

The exemplary pulsed IR laser source 12 adapted for display applications is shown in more detail in FIG. 2 and includes a laser medium 22, for example, a neodymium (Nd)-containing laser medium, such as neodymium yttrium vanadate (Nd:YVO$_4$), which can be optically pumped, for example, side-pumped with laser diode bars 25a, 25b or with other suitable pump sources known in the art. The laser medium 22 is typically arranged in a cavity defined by a reflecting end mirror 23 and a partially reflecting output mirror 24 to produce an IR laser output beam 29. Also arranged inside the laser cavity is a Q-switch 26, which can be an acousto-optic or electro-optic Q-switch. The timing of the Q-switch is controlled by timing pulses generated by a trigger generator 27, whose operation will be described in more detail below with reference to FIG. 4A. The laser cavity is designed to operate at a high pulse repetition rate (40–80 kHz range) and to produce very short pulse (FWHM≅10–15 ns range). As mentioned above, the output wavelength in the described example is approximately 1064 nm and pulse width and pulse rate can be selected by triggering the Q-switch accordingly.

The high peak power of the IR laser light source in pulsed operation permits the use of various non-linear frequency conversion processes, such as Optical Parametric Oscillation (OPO) and Sum of Frequency Mix (SFM) to produce from the fundamental laser radiation of 1064 nm the visible wavelengths required for projecting color images. Because of the non-linear optical frequency conversion, the visible output power is a super-linear function of the IR input power.

For modulating and displaying the three-color image, the R,G,B laser light source 10 can be coupled with spatial light modulators. One type of spatial light modulators is a liquid crystal display (LCD) panel.

Figure 3:
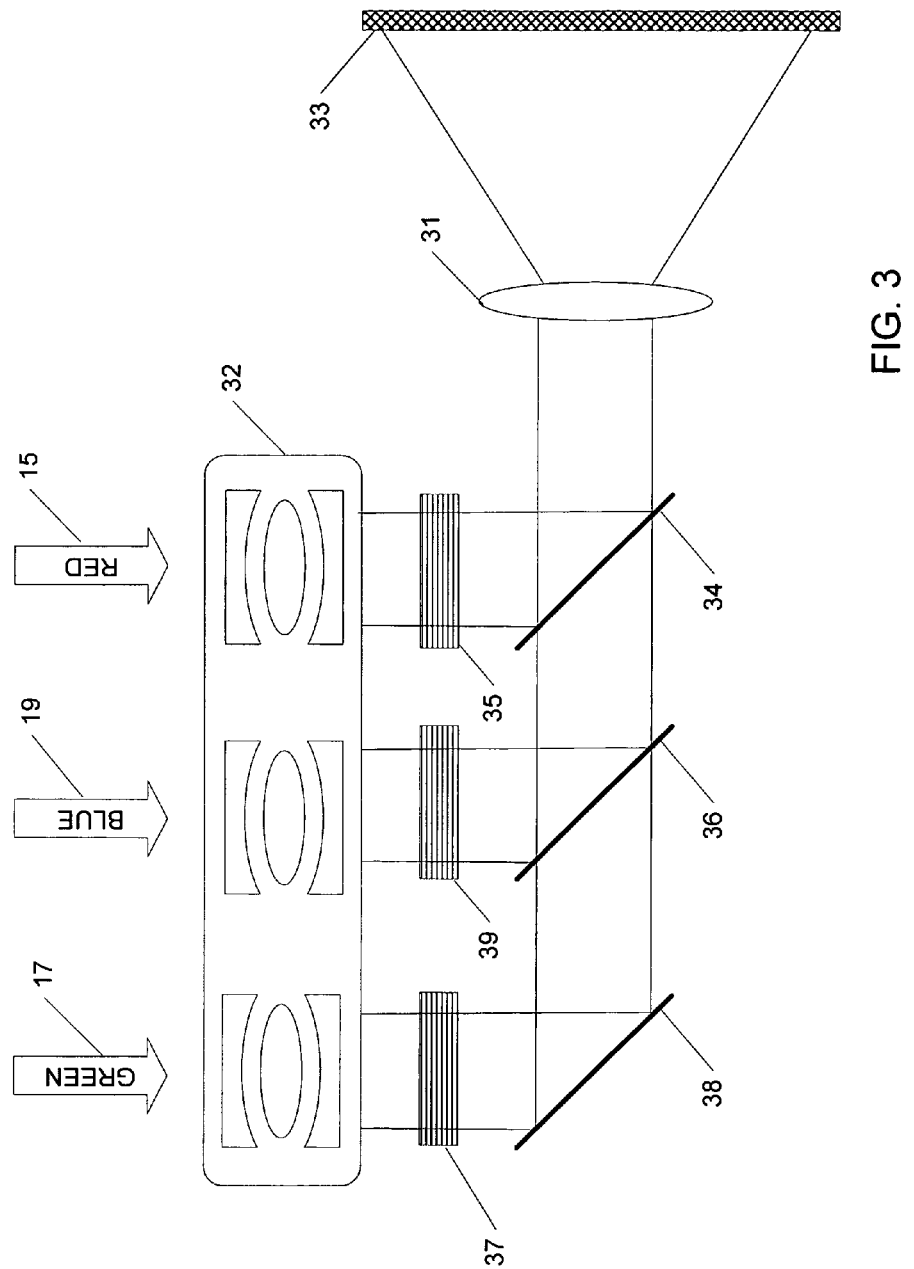
FIG. 3 shows an exemplary three-color projection system using the R,G,B laser light source of FIG. 1.

Turning now to FIG. 3, shows a schematic diagram of the R,G,B laser light source 10 emitting red 15, green 17 and blue 19 light beams (see FIG. 1) which are coupled with three transmissive LCD panels 35, 37, 39 operating as spatial light modulators. The LCD panels 35, 37, 39 receive image information to be projected. Since LCD panels are insensitive to the pulse width modulation, the R,G,B laser light source can be coupled with both transmissive LCD panels 35, 37, 39 and reflective LCD panels (LCoS; Liquid Crystal on Silicon) (not shown).

The R,G,B light beams 15, 17, 19 are expanded in a beam expander 32 before passing through the respective spatial light modulators, LCD panels 35, 37, 39 where the expanded R,G,B light beams are modulated with the image information (not shown). The expanded modulated R beam is reflected by mirror 38 and passes through mirrors 34, 36 which are transparent to the green wavelength. Likewise, the expanded modulated B beam 19 is reflected by mirror 36 and passes through mirror 34, which is also transparent to the blue wavelength. The expanded modulated R beam 15 is reflected by mirror 34. The reflected beam together form an overlapping modulated RBG beam that passes through projection optics 31, with the image being projected onto projection screen 33.

Figure 4A:
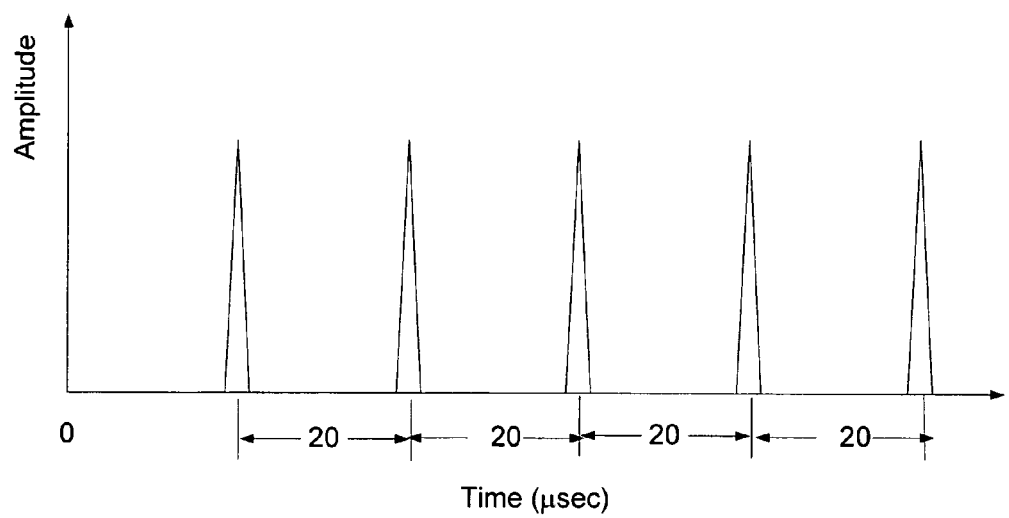
FIG. 4A shows a conventional pulse sequence applied to the Q-switch of FIG. 2.

As mentioned above with reference to FIG. 2, trigger generator 27 produces the trigger pulses that operate the Q-switch 26. An exemplary trigger sequence for the Q-switch is depicted in FIG. 4A. The high peak power from the exemplary Q-switched Nd:YVO$_4$ pump laser (or Master-Oscillator-Power-Amplifier—MOPA) provides a high R,G,B average output power, while being flicker-free due to the high repetition rate of approximately 50 kHz. In normal operation, the trigger pulses are spaced apart by approximately 20 µs to produce the high power R,G,B laser beams.

Figure 4B:
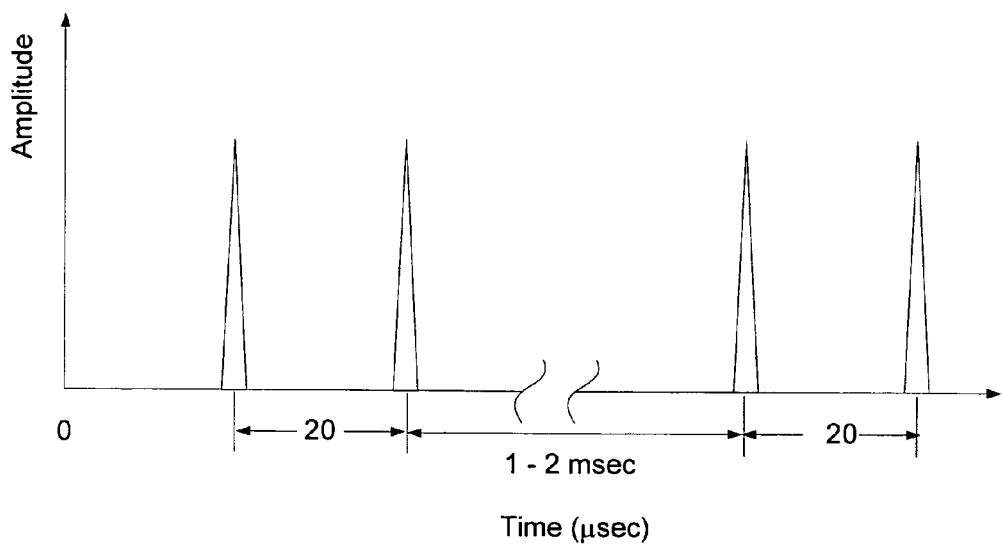
FIG. 4B shows a pulse sequence with an anti-piracy blanking period applied to the Q-switch of FIG. 2.

Turning now to FIG. 4B, the trigger sequence of Q-switch 26 can be changed, by not triggering the Q-switch 26 for a duration of, for example, approximately 1–2 ms, thereby placing Q-switch 26 in an OPEN position. This will not change the time-averaged output power of the pulsed IR laser source 12, but will substantially reduce the peak power of the pulsed IR laser source 12 during the time the Q-switch is in the OPEN position. Due to the nonlinear optical conversion in the R, G and B channels 14, 16, 18, the average power produced by the R,G,B output channels 15, 17, 19 will decrease dramatically during this time period of 1–2 ms. As a result, no red or blue light is generated due to the nonlinear design of the R and B channels. A very small intensity (less than ½ W) will be generated in the green channel even when the pump laser is in a low power CW mode. However, this low intensity in the green amounts only to a small "leakage" considering the fact that 16.5 W of green with wavelength of 532 nm is needed to produce a (practical) 13,000 lumen R,G,B laser light source with a red wavelength of 628 nm and a blue wavelength of 447 nm. This approach allows introduction of a blanking period in the image simply by adjusting the trigger sequence of the Q-switch 26. The OPEN Q-switch position can be placed anywhere in the sequence of trigger pulses. By making the OPEN time 1–2 ms or shorter, the blank screen will not be noticed by an observer, while the average optical output power from the R, G, B channels 15, 17, 19 will be deduced by very negligible amount.

In summary, the trigger sequence of the Q-switch 26 of the laser light source 12 can be changed so that only quasi-CW IR laser light is produced by the pulsed IR laser source 12 for time periods of milliseconds. The resulting low peak power during this time interval will produce only an imperceptible amount of R,G,B light during this period (i.e. an at most faint image). As a result, the projected image has a timing pattern similar to that of an image projected frame-by-frame from a conventional movie film and include blank periods between frames. While these blank periods are not perceived by the human eye, a recording by a camcorder will become objectionable and commercially worthless as a master for DVD reproduction.

This feature cannot be attained with lamp-based projectors using LCD-based light valves or with other CW or mode-locked laser sources, which cannot easily be turned off and on for brief time periods of less than 10 ms duration. Long time periods of 10 ms or more will be perceived by the human eye as flicker and are hence unsuitable for image projection. However, the method and system of the invention can still be used with pulsed laser systems using LCD-based light valves, since the on/off timing is provided by the laser light source itself and not by the light valve. Moreover, this feature can be easily added to existing Q-switched laser projection systems.

While the invention has been disclosed in connection with the preferred embodiments shown and described in detail, various modifications and improvements thereon will become readily apparent to those skilled in the art. For example, more than one pulsed IR laser source can be used to pump the non-linear optical converters 14, 16, 18. Alternatively, Q-switched lasers with emission wavelengths in the visible spectral range can be employed, as long a the Q-switches in these embodiments are triggered with a pulse sequence equivalent to that described above for the single pulsed IR laser source 12. Accordingly, the spirit and scope of the present invention is to be limited only by the following claims.

What is claimed is:

1. A pulsed laser device comprising:
   an optical cavity;
   an optically pumped laser medium and a Q-switch disposed in the optical cavity; and
   a trigger generator producing trigger pulses to trigger the Q-switch, said trigger pulses having a temporal pattern which includes a blanking period;
   wherein a duration of the blanking period is selected to be longer than a repetition time between consecutive trigger pulses and shorter than a time period perceived by the human eye.

2. The laser device of claim 1, wherein the repetition time between the consecutive trigger pulses corresponds to a pulse repetition rate of between approximately 10 and 100 kHz.

3. The laser device of claim 1, wherein the repetition time between the consecutive trigger pulses corresponds to a pulse repetition rate of approximately 50 kHz.

4. The laser device of claim 1, wherein the duration of the blanking period is between approximately 1 and 10 milliseconds.

5. The laser device of claim 1, wherein the duration of the blanking period is between approximately 1 and 2 milliseconds.

6. The laser device of claim 1, wherein the trigger pulses have a pulse width of between approximately 1 and 20 nanoseconds.

7. The laser device of claim 1, wherein the trigger pulses have a pulse width of approximately 10 nanoseconds.

8. The laser device of claim 1, wherein the laser medium comprises $Nd:YVO_4$.

9. A laser display system comprising:
   a pulsed laser device with
   an optical cavity;
   an optically pumped laser medium and a Q-switch disposed in the optical cavity;
   a trigger generator producing trigger pulses to trigger the Q-switch, said trigger pulses having a temporal pattern which includes a blanking period, said pulsed laser device emitting a pulsed pump beam;
   non-linear optical conversion means receiving the pulsed pump beam and frequency-converting the pulsed pump beam into an imaging beam; and
   a spatial light modulator receiving image information and modulating the imaging beam according to the received image information to produce a displayed image,
   wherein a duration of the blanking period is selected to be longer than a repetition time between consecutive trigger pulses and shorter than a time period perceived by the human eye.

10. The laser projection system of claim 9, wherein the non-linear optical conversion means comprise a plurality of non-linear optical frequency converters to produce separate RGB imaging beams.

11. The laser projection system of claim 10, wherein the separate RGB imaging beams are modulated and combined to form a color image.

12. The laser device of claim 9, wherein the repetition time between the consecutive trigger pulses corresponds to a pulse repetition rate of between approximately 10 and 100 kHz.

13. The laser device of claim 9, wherein the repetition time between the consecutive trigger pulses corresponds to a pulse repetition rate of approximately 50 kHz.

14. The laser device of claim 9, wherein the duration of the blanking period is between approximately 1 and 10 milliseconds.

15. The laser device of claim 9, wherein the duration of the blanking period is between approximately 1 and 2 milliseconds.

16. The laser device of claim 9, wherein the trigger pulses have a pulse width of between approximately 1 and 20 nanoseconds.

17. The laser device of claim 9, wherein the trigger pulses have a pulse width of approximately 10 nanoseconds.

18. The laser device of claim 9, wherein the laser medium comprises $Nd:YVO_4$.

19. A method of displaying an image with anti-piracy protection, comprising:
   producing a Q-switched pulsed laser output beam, said Q-switched beam being switched by trigger pulses having a temporal pattern that includes a blanking period;
   converting said pulsed laser output beam by non-linear optical frequency conversion to an imaging beam;
   modulating said imaging beam with image information; and
   displaying an image formed from said imaging beam containing said image information,
   wherein a duration of the blanking period is selected to be longer than a repetition time between consecutive trigger pulses and shorter than a time period perceived by the human eye.

20. The method of claim 19, wherein the non-linear optical frequency conversion produces separate RGB imaging beams, and said displayed image is a full color image.

* * * * *